(12) United States Patent
Buettner et al.

(10) Patent No.: US 11,065,971 B2
(45) Date of Patent: Jul. 20, 2021

(54) CHARGING CONNECTION MODULE FOR A VEHICLE

(71) Applicant: Bayerische Motoren Werke Aktiengesellschaft, Munich (DE)

(72) Inventors: Robin Buettner, Niederding (DE); Stephan Grossmann, Simpsonville, SC (US); Markus Ebner, Atting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/156,019

(22) Filed: Oct. 10, 2018

(65) Prior Publication Data

US 2019/0039468 A1 Feb. 7, 2019

Related U.S. Application Data

(63) Continuation of application No. PCT/EP2017/058400, filed on Apr. 7, 2017.

(30) Foreign Application Priority Data

Apr. 11, 2016 (DE) ...................... 10 2016 206 002.3

(51) Int. Cl.
*H01R 13/504* (2006.01)
*B60L 53/16* (2019.01)
(Continued)

(52) U.S. Cl.
CPC ............ *B60L 53/16* (2019.02); *H01R 13/504* (2013.01); *H01R 13/74* (2013.01); *H01R 43/18* (2013.01);
(Continued)

(58) Field of Classification Search
CPC . B60L 11/1818; H01R 13/504; H01R 13/744; H01R 43/24; Y10T 29/49158; Y10T 29/4922
(Continued)

(56) References Cited

U.S. PATENT DOCUMENTS 5,751,135 A * 5/1998 Fukushima ......... B60L 11/1818
320/107
5,823,811 A * 10/1998 Blanchfield ........ H01R 13/5025
439/274
(Continued)

FOREIGN PATENT DOCUMENTS

CN 201419685 Y 3/2010
CN 203645071 U * 6/2014
(Continued)

OTHER PUBLICATIONS

International Search Report (PCT/ISA/210) issued in PCT Application No. PCT/EP2017/058400 dated Jun. 8, 2017 with English translation (four (4) pages).
(Continued)

*Primary Examiner* — Peter G Leigh
(74) *Attorney, Agent, or Firm* — Crowell & Moring LLP

(57) ABSTRACT

A charging connection module for a vehicle includes a charging socket for electrical contacting with an external electricity source and a pot unit which constitutes a mounting for the charging socket and which is fastenable to an outer panel of the vehicle. The charging socket is integrated into the pot unit in an injection molded manner.

2 Claims, 3 Drawing Sheets

(51) Int. Cl.
*H01R 13/74* (2006.01)
*H01R 43/18* (2006.01)
*B29L 31/36* (2006.01)
*B60K 1/04* (2019.01)
*B29C 45/16* (2006.01)
*B29C 45/14* (2006.01)
*H01R 13/447* (2006.01)
*H01R 13/717* (2006.01)

(52) U.S. Cl.
CPC .... *B29C 45/14639* (2013.01); *B29C 45/1615* (2013.01); *B29L 2031/36* (2013.01); *B60K 1/04* (2013.01); *B60Y 2200/91* (2013.01); *B60Y 2200/92* (2013.01); *H01R 13/447* (2013.01); *H01R 13/7175* (2013.01); *H01R 2201/26* (2013.01); *Y02T 10/70* (2013.01); *Y02T 10/7072* (2013.01); *Y02T 90/14* (2013.01)

(58) Field of Classification Search
USPC .............................................. 439/136; 29/860
See application file for complete search history.

(56) References Cited

U.S. PATENT DOCUMENTS

| | | | | |
|---|---|---|---|---|
| 6,601,296 | B1* | 8/2003 | Dailey | H01R 13/035 164/98 |
| 6,634,897 | B2* | 10/2003 | Cykon | H01R 43/18 439/318 |
| 7,210,917 | B2* | 5/2007 | Lai | B29C 45/1615 264/255 |
| 7,951,322 | B2* | 5/2011 | Clark | B29C 45/045 264/261 |
| 8,317,376 | B2* | 11/2012 | Hook | B60L 11/1818 362/459 |
| 8,460,039 | B2* | 6/2013 | Akuta | B29C 45/14467 29/848 |
| 8,616,909 | B2* | 12/2013 | Kurumizawa | E05B 83/00 320/109 |
| 8,628,225 | B2* | 1/2014 | Hook | B60Q 1/2661 362/459 |
| 8,827,731 | B2* | 9/2014 | Sasaki | B60L 11/1818 439/206 |
| 8,905,768 | B2* | 12/2014 | Hara | B60L 11/1818 439/136 |
| 8,951,060 | B2* | 2/2015 | Meyer-Ebeling | H01R 13/639 320/109 |
| 9,463,702 | B2* | 10/2016 | Fukushima | H01R 13/502 |
| 2004/0119200 | A1* | 6/2004 | Gram | B29C 45/062 264/255 |
| 2011/0306223 | A1* | 12/2011 | Bauer | H01R 13/447 439/136 |
| 2012/0111451 | A1 | 5/2012 | Zentner | |
| 2013/0249486 | A1 | 9/2013 | Eberle | |
| 2015/0104961 | A1* | 4/2015 | Bito | B60L 11/1818 439/142 |
| 2015/0137756 | A1* | 5/2015 | Fukushima | H01R 13/447 320/109 |
| 2015/0224887 | A1* | 8/2015 | Toth | H01R 13/514 320/109 |
| 2015/0229055 | A1* | 8/2015 | Fukushima | H01R 13/08 439/733.1 |
| 2015/0283741 | A1* | 10/2015 | Engelmann | B29C 45/162 264/254 |

FOREIGN PATENT DOCUMENTS

| | | |
|---|---|---|
| DE | 10 2011 108 817 A1 | 8/2012 |
| DE | 10 2012 102 419 A1 | 9/2013 |
| DE | 10 2013 021 849 A1 | 8/2014 |
| DE | 102013021849 * | 8/2014 |
| DE | 10 2013 206 855 A1 | 10/2014 |
| EP | 2 347 924 A1 | 7/2011 |
| WO | WO 2010/032160 A1 | 3/2010 |
| WO | WO 2010/112099 A1 | 10/2010 |

OTHER PUBLICATIONS

German-language Written Opinion (PCT/ISA/237) issued in PCT Application No. PCT/EP2017/058400 dated Jun. 8, 2017 (five (5) pages).
German-language Search Report issued in counterpart German Application No. 102016206002.3 dated Mar. 9, 2017 with partial English translation (13 pages).
Chinese Office Action issued in Chinese application No. 201780022714.4 dated Mar. 17, 2020, with English translation (Seventeen (17) pages).
Chinese Office Action issued in Chinese application No. 201780022714.4 dated Jul. 29, 2020 (Ten (10) pages).

* cited by examiner

CHARGING CONNECTION MODULE FOR A VEHICLE

CROSS REFERENCE TO RELATED APPLICATIONS

This application is a continuation of PCT International Application No. PCT/EP2017/058400, filed Apr. 7, 2017, which claims priority under 35 U.S.C. § 119 from German Patent Application No. 10 2016 206 002.3, filed Apr. 11, 2016, the entire disclosures of which are herein expressly incorporated by reference.

BACKGROUND AND SUMMARY OF THE INVENTION

The present invention relates to a charging connection module for a vehicle. The invention also relates to a vehicle having a charging connection module of said type. Finally, the invention relates to a method for producing a charging connection module, and to a vehicle having a charging connection module of said type. The charging connection module serves in particular for the charging of an energy store of an electric vehicle or hybrid vehicle.

Charging connection modules are known from the prior art. Such known charging modules normally have the following construction: a bolt is attached to an inner bodyshell of the vehicle. A holder of a charging socket can be fastened to said bolt. The holder of the charging socket serves in turn for receiving a charging socket, which is connected to a wiring harness of the vehicle. For a visual illustration of the present state of charge, a corona ring is arranged around the charging socket, by means of which corona ring it is possible for different colors to be displayed. Finally, a charging flap system is inserted into an outer panel of the vehicle, that is to say into a part of the bodyshell which is visible from outside the vehicle. The charging flap system includes at least one charging flap which allows access through the outer panel of the vehicle to the charging socket. To ensure that only the charging socket can be accessed through said opening, a charging pot is provided which, by way of a centered seal, is mounted sealingly onto the charging socket. Thus, a two-part system is provided, because the bolt, the holder and the charging socket itself are fastened to an inner part of the bodyshell, whereas the charging flap system is fastened to an outer panel of the vehicle. Such a construction is known for example from DE 10 2013 206 855 A1. This document additionally discloses that, by means of a holding element, the charging pot is likewise supported on the inner bodyshell component, on which the holder for the charging socket is also fastened. In this way, it is possible in particular for dimensional tolerances and/or installation tolerances between the inner and outer vehicle bodyshell to be compensated.

It is evident that such a system is very complex to install. In particular, it is necessary for a multiplicity of individual components to be individually installed, giving rise to a multiplicity of component tolerances and installation tolerances. In this way, tolerance-free installation is not ensured, whereby the charging system does not have a high-quality appearance. Furthermore, a repeatedly uniform appearance is not possible owing to the large tolerances.

It is an object of the present invention to provide a charging connection module for a vehicle, which module, while being simple and inexpensive to produce and install, permits secure and reliable installation on a vehicle, wherein a reproducible appearance is ensured.

This and other objects are achieved by a charging connection module for a vehicle, comprising a charging socket and a pot unit. The charging socket serves for electrical contacting with an external electricity source. In particular, the charging socket is connectable to a wiring harness of the vehicle in order to supply an energy store of the vehicle with electrical energy. The pot unit is provided as a mounting for the charging socket. Provision is thus made in particular for the charging socket to be held entirely by the pot unit, whereby the charging socket is preferably fastened to the pot unit. The pot unit is fastenable to an outer panel of the vehicle. Here, the outer panel is to be understood to mean that part of a bodyshell of the vehicle which is visible to a viewer outside the vehicle. For example, the outer panel is a fender or a bumper of the vehicle. In particular, the pot unit is designed to be fastened exclusively to the outer panel. By means of such a design of the charging connection module, it is made possible in particular for the charging socket holder and the associated bolt on the bodyshell of the vehicle to be omitted. Thus, simple and inexpensive installation is ensured. Since the pot unit functions as a holder for the charging socket, a reproducible high-quality appearance is ensured.

Provision is preferably made for the charging socket to be integrated into the pot unit. The charging socket is particularly advantageously injection-molded into the pot unit. Thus, in particular, a combined module is provided which includes the charging socket and the pot unit. The combined module can be inserted into an outer panel of the vehicle, whereby a process of installation of the charging connection module is simplified. At the same time, the number of manufacturing tolerances is minimized, because only one combined module has to be manufactured. In this way, it is furthermore the case that the installation tolerances are minimized, because only a single element, the combined module, has to be installed. This in turn permits a reproducible and high-quality visual appearance.

The charging socket is alternatively preferably connected in positively locking, cohesive and/or frictionally locking fashion to the pot unit. The charging socket is particularly advantageously screwed to the pot unit. For this purpose, the charging socket preferably has passage openings through which screws can be inserted in order for the screws to be screwed to fixing points of the pot unit. In this way, the charging socket and pot unit are manufactured separately from one another, and are in particular exchangeable. It is thus advantageously possible for a multiplicity of different charging sockets to be combined with a single type of pot unit. This is advantageous in particular if the charging connection module must be varied owing to regional differences in the design of the charging socket. In particular, in this way, it is possible for a single pot unit to be manufactured which can be combined with different known charging sockets in order to manufacture the charging connection module. In a particularly advantageous embodiment, the passage openings of the charging socket correspond to openings which are known from the prior art for the purposes of installing the charging socket on the previously used holder which is fastened to the inner bodyshell of the vehicle. Thus, a use of charging sockets known from the prior art with the present invention is made possible.

The pot unit advantageously has a flap. Access to the charging socket is made possible by means of the flap. In particular, it is furthermore possible for the outer panel of the vehicle to be closed by way of the flap, whereby a uniform appearance of the outer panel is advantageously ensured.

When access is required to the charging socket, the flap can be opened in order to permit electrical contacting with the charging socket.

The invention also relates to a vehicle which includes a charging connection module. The charging connection module is preferably a charging connection module as described above. The charging connection module is installed in an outer panel of the vehicle. The charging connection module is preferably fastened exclusively in the outer panel of the vehicle, whereby no additional holding elements are required. In this way, the charging connection module can be installed easily and inexpensively on the vehicle. This furthermore permits a reproducible high-quality visual appearance.

The charging connection module is particularly preferably received in an opening of the outer panel. The opening is advantageously closed by the charging connection module. Provision is furthermore preferably made for the charging connection module to be connected in positively locking fashion to the outer panel as a result of the insertion into the opening. This is advantageously realized by means of a multiplicity of clip elements. The charging connection module can thus be easily and inexpensively integrated into the outer panel, whereby a secure and reliable connection between the outer panel and the charging connection module is ensured by way of the positive locking.

The invention also relates to a method for producing a charging connection module. The charging connection module corresponds in particular to the charging connection module described above. The method comprises the following steps: both a charging socket and a pot unit are provided. The charging socket is electrically contactable with an external electricity source. In particular, the charging socket is designed to transmit currents that are required for charging an energy store of an electric vehicle or of a hybrid vehicle. The pot unit is preferably fastenable to an outer panel of the vehicle. The provision of the pot unit is particularly advantageously realized by virtue of the pot unit being injection molded. The steps of the provision of the charging socket and of the provision of the pot unit are particularly preferably performed in any desired sequence. Likewise, it is particularly advantageous for the subsequent step of connection to be performed after the steps of the provision of charging socket and pot unit. During the step of the connection, the charging socket and the pot unit are connected. As an alternative to the step of the connection, an integration of the charging socket into the pot unit is performed. Thus, with simple and inexpensive measures, a charging connection module can be produced which can be integrated into an outer panel of the vehicle in order to thereby fasten the charging connection module to the vehicle in a simple manner.

The method according to the invention permits manufacturing of the charging connection module with small manufacturing tolerances, and installation of the charging connection module with small installation tolerances, because the number of required individual components is minimized. This is performed in particular by means of the step of the connection or the integration. In particular, the step of the connection may advantageously be performed either during the manufacture of the charging connection module or during the installation of the charging connection module into the vehicle.

In a preferred embodiment, the charging socket is injection-molded into the pot unit. For this purpose, an adapted injection-molding tool is advantageously provided which has two cavities. The basic form of the pot unit is injection molded in a first cavity, wherein subsequently, the basic form and the charging socket are placed into a second cavity of the injection-molding tool. By means of a further injection-molding process, it is thus possible for the pot unit to be manufactured, wherein, at the same time, the charging socket is fixedly integrated into the pot unit. The charging connection module thus comprises a combined module composed of pot unit and charging socket, whereby the installation of the charging connection module on the vehicle is simplified.

In an alternative, provision is made for the charging socket to be connected in cohesive and/or in positively locking and/or frictionally locking fashion to the pot unit. In particular, the charging socket is screwed to the pot unit. Such a connection may advantageously be performed immediately before an installation of the charging connection module into a vehicle. It is thus made possible in particular for the charging connection module to be produced by different suppliers, by virtue of a charging socket suited to the vehicle to be manufactured being mounted onto the pot unit. By means of the connection between charging socket and pot unit, it is realized that the charging socket is held exclusively by the pot unit. Additional components for holding the charging socket are thus not required on the vehicle.

The invention finally relates to a method for producing a vehicle. The vehicle is in particular a vehicle as described above. The method comprises the following steps: firstly, a charging module as has been described above is produced. The pot unit is subsequently fastened to an outer panel of the vehicle. The outer panel of the vehicle is a region of the bodyshell which is visible to a viewer standing outside the vehicle. In particular, the pot unit is fastened exclusively to the outer panel of the vehicle. Thus, the outer panel of the vehicle is a support for the pot unit and thus for the charging connection module. The charging connection module is in particular received in an opening of the outer panel. At the same time, positive locking between outer panel and pot unit is preferably realized, such that the charging connection module is connected securely and reliably to the outer panel of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
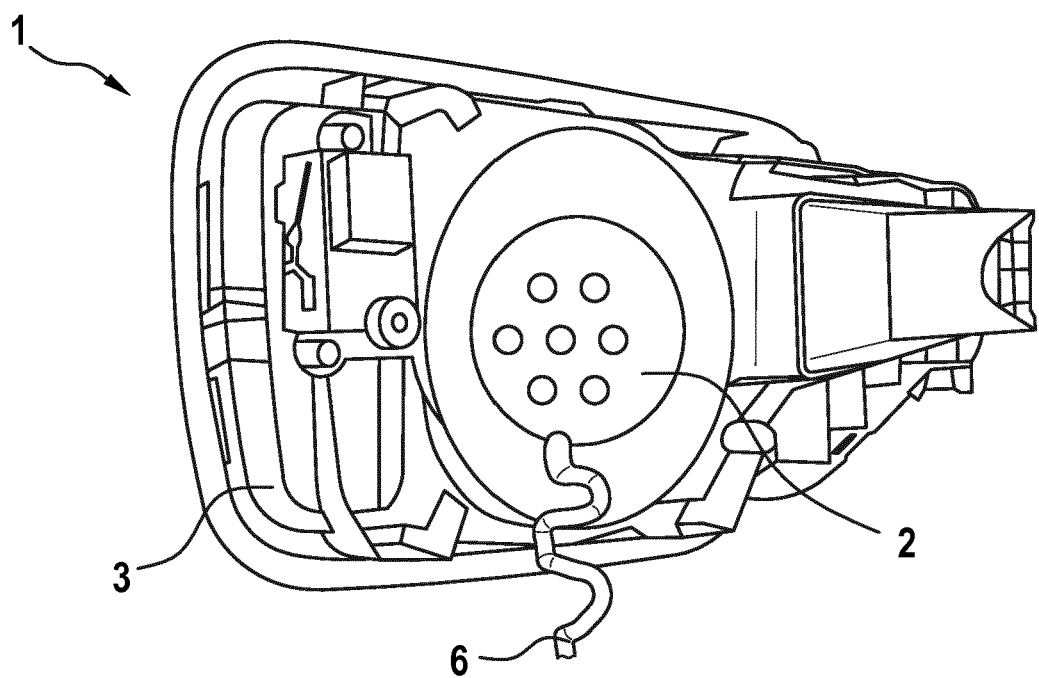
FIG. 1 is a first schematic image of a charging connection module as per a first exemplary embodiment of the invention.

FIG. 1 schematically shows a charging connection module 1 as per a first exemplary embodiment of the invention.

Figure 2:
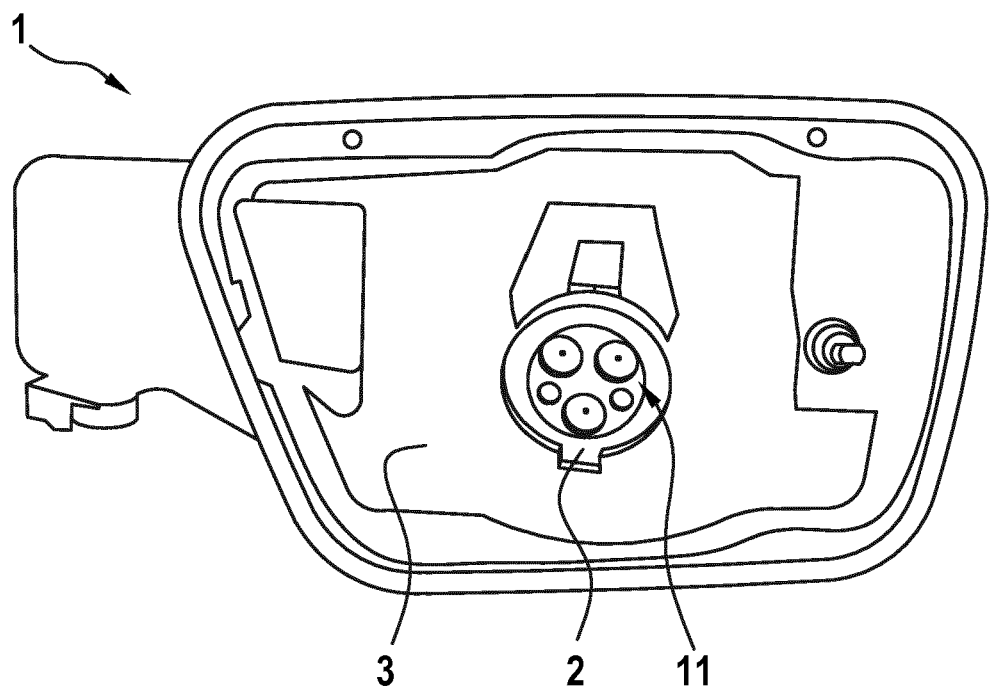
FIG. 2 is a second schematic image of the charging connection module as per the first exemplary embodiment of the invention.

The same charging connection module 1 is also shown in FIG. 2. Here, FIG. 2 shows a front view of the charging connection module 1, as seen by a viewer from outside the vehicle 10 (see FIG. 5) in which the charging connection module 1 is installed. FIG. 1 shows a rear view of the charging connection module 1, as would be visible from within the vehicle.

The charging connection module 1 has a charging pot 3 and a charging socket 2. The charging socket 2 has a connection region 11, wherein the connection region 11 is designed for electrical contacting with a charging plug. By means of the charging plug, electrical energy can be transmitted to the charging socket 2, whereby, in particular, an energy store 12 of a vehicle 10 can be charged.

Figure 5:
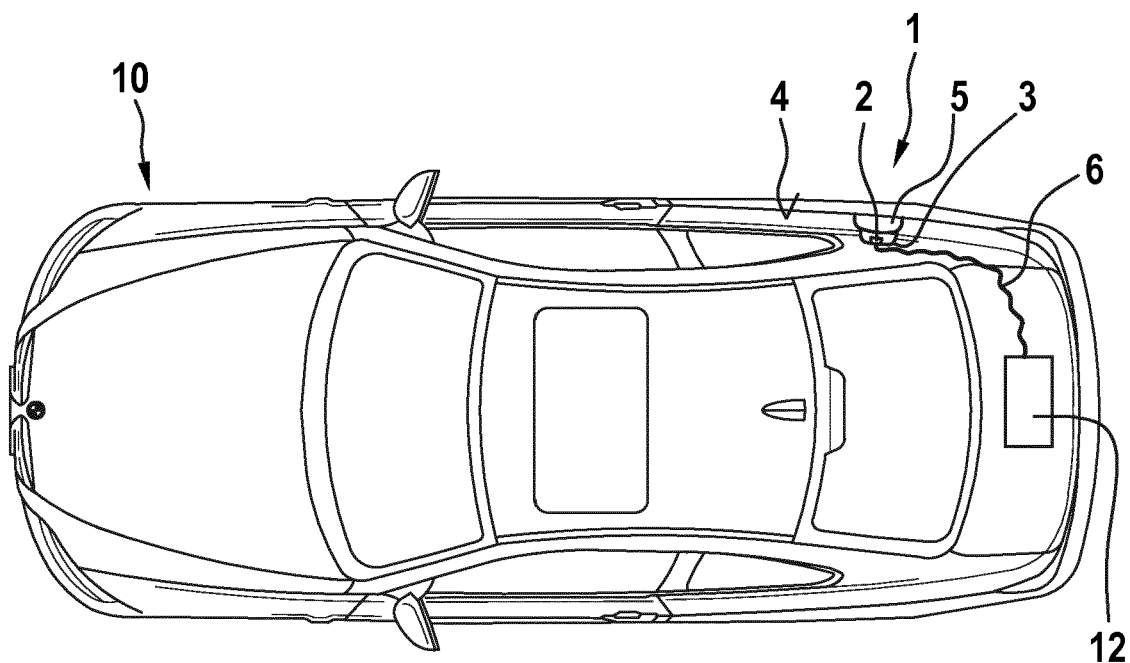
FIG. 5 shows a vehicle as per an exemplary embodiment of the invention.

FIG. 5 shows a vehicle 10 as per an exemplary embodiment of the invention. The vehicle 10 comprises a charging connection module 1 as shown in FIGS. 1 and 2. Here, the charging connection module 1 is designed such that the pot element 3 has a flap 5. The flap 5 terminates flush with an outer panel 4 of the vehicle 10, such that a high-quality appearance of the outer panel 4 of the vehicle 10 is ensured.

The charging socket 2 is connected via a cable element 6 to an energy store 12 of the vehicle 10. Energy can thus be transmitted from an external electricity source via a charging cable to the charging socket 2, and thus to the energy store 12. In this way, the vehicle 10, which is designed as a hybrid vehicle or as an electric vehicle, can be supplied with electrical energy.

For the fastening of the charging connection module 1 to the vehicle 10, the pot element 3 is connected to the outer panel 4 of the vehicle 10. In particular, in the outer panel 4, there is provided an opening into which the pot unit 3 is inserted. The pot unit 3 is preferably connected in positively locking fashion to the outer panel 4 by way of clip elements.

As can be seen from FIGS. 1 and 2, the charging connection module 1 comprises a combined module composed of charging socket 2 and pot unit 3. This is achieved in particular by virtue of an injection-molding tool with two cavities being used for manufacturing the pot unit 3. For this purpose, by means of a first cavity of the injection-molding tool, a basic form of the pot unit 3 is manufactured, in particular by plastics pressure casting. The charging socket 2 and the produced basic form are subsequently placed into a second cavity of the injection-molding tool. Final manufacturing of the pot unit 3 is performed within the second cavity, wherein the charging socket 2 is simultaneously injection-molded into the pot unit 3. Thus, the described combined module is realized. It is at the same time ensured that the charging socket 2 is held exclusively by the pot unit 3. Installation of the charging connection module 1 on the vehicle 10 is thus simplified, because only the positively locking connection of the pot unit 3 to the outer panel 4 has to be performed. No further installation steps are necessary.

Only the flap 5 and a locking element or an opening and closing element for the flap 5 have to be additionally installed. It is likewise advantageously possible for a support element to be attached between the charging connection module 1 and an inner bodyshell of the vehicle 10, that is to say a part of the bodyshell of the vehicle 10 which is not visible to a viewer outside the vehicle 10. It is ensured in this way that the charging connection module 1 is fastened securely and reliably to the vehicle 10.

To permit a visual display of a state of charge, provision is preferably made for an illumination unit to be integrated into the pot unit 3. The illumination unit advantageously comprises a lighting strip, a light-emitting diode strip and/or a single light-emitting diode. By virtue of the illumination unit being integrated into the charging pot 3, simple and inexpensive production of the visualization of the state of charge is made possible.

Figure 3:
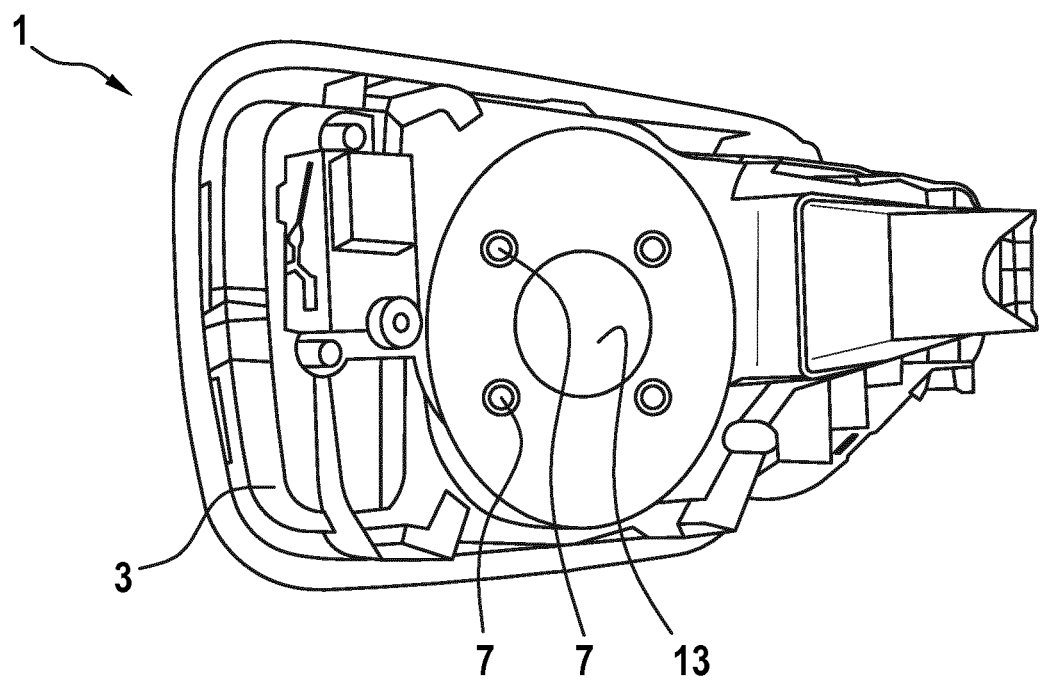
FIG. 3 is a schematic image of a pot unit of a charging connection module as per a second exemplary embodiment of the invention.
Figure 4:
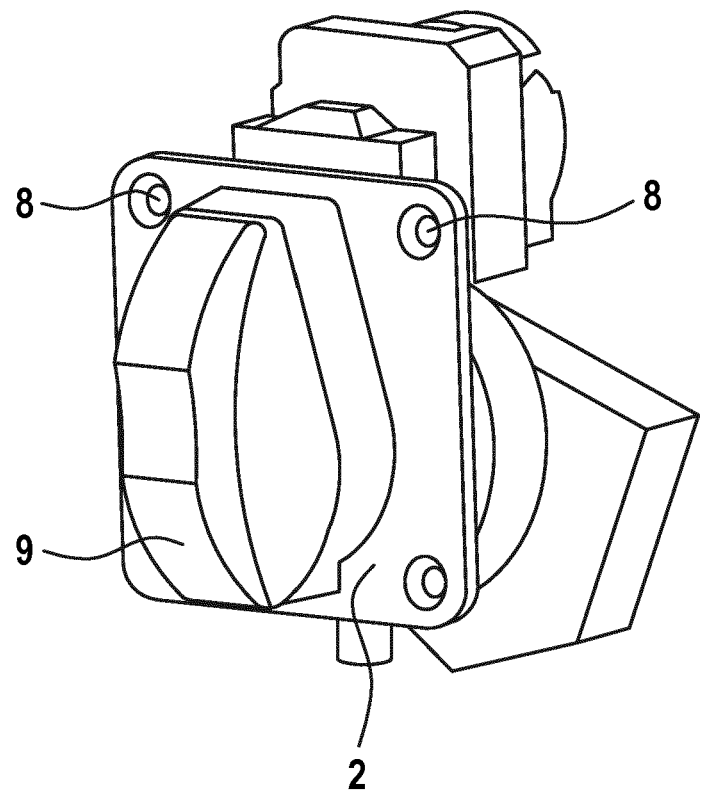
FIG. 4 is a schematic image of a charging socket of the charging connection module as per the second exemplary embodiment of the invention.

FIGS. 3 and 4 show components of a charging connection module 1 as per a second exemplary embodiment of the invention. The charging connection module 1 as per the second exemplary embodiment of the invention is basically interchangeable with the charging connection module 1 as per the first exemplary embodiment of the invention.

FIG. 3 shows a pot unit 3 which is advantageously substantially identical to the pot unit 3 of the charging connection module 1 as per the first exemplary embodiment. By contrast, however, the charging socket 2 is not integrated into the pot unit 3. Rather, the pot unit 3 has a central opening 13, wherein access to the connection region 11 of a charging socket 2 is made possible via the central opening 13. Around the central opening 13, there are arranged installation points 7 to which the charging socket 2 can be fastened, in particular fixedly screwed.

FIG. 4 shows a charging socket 2 of the charging connection module 1 as per the second exemplary embodiment of the invention. Here, the connection region 11 is concealed by a protective cap 9. The protective cap 9 is optional and may be omitted. It is likewise possible for the protective cap 9 to be used in the first exemplary embodiment to cover the connection region 11.

The charging socket 2 has a multiplicity of passage openings 8. Screws can be led through the passage openings 8, wherein the screws can be screwed to the installation points 7 of the pot unit 3. The charging socket 2 can be attached to the pot unit 3 in this way. By means of the screw connection, it is made possible for different charging sockets 2 to be attached to the pot unit 3, such that the charging socket 2 can be adapted to external conditions of the vehicle 10. Such external conditions are in particular different standards in the configuration of the charging socket 2. For example, it is conventional for different charging sockets 2 to be used in each case in Asia, Europe and the USA. In particular, the charging connection module 1 as per the second exemplary embodiment allows a final connection between charging socket 2 and pot unit 3 to be made immediately before an installation of the charging connection module into the vehicle 10, whereby the charging connection module can be of flexible design. As an alternative to the screw connection, it is also possible for the charging socket 2 to be adhesively bonded or connected in positively locking fashion to the pot unit 3, in particular by use of clip elements.

The charging connection module 1 is insertable into the vehicle 10 analogously to the first exemplary embodiment, such that the pot unit 3 is in particular connected in positively locking fashion to the outer panel 4 of the vehicle 10 by means of clip elements. The charging socket 2 is connectable to the energy store 12 of the vehicle 10 by means of a cable element 6. As in the first exemplary embodiment, it is preferable for a flap to be installed on the pot unit 3, wherein additional locking elements and/or opening and closing elements of the flap 5 may be installed. The introduction of an illuminant unit into the pot unit 3 is realized in a manner analogous to that in the first exemplary embodiment. It is likewise preferably possible for a support element to be introduced analogously to the first exemplary embodiment.

Whereas the first exemplary embodiment permits simple installation owing to the integration of the charging socket 2 into the pot unit 3, the second exemplary embodiment permits a flexible design of the charging connection module 1. It can thus be ensured in particular that different standards in the configuration of the charging sockets 2 in different regions can be allowed for. Both exemplary embodiments have in common the fact that the charging socket 2 is supported exclusively by means of the pot element 3. Thus, no additional components for supporting the charging socket 2 are provided on the vehicle 10, whereby the installation of the charging socket 2 and of the charging connection module 1 as a whole is simplified.

LIST OF REFERENCE DESIGNATIONS

1 Charging connection module
2 Charging socket
3 Pot unit
4 Outer panel
5 Flap
6 Cable element
7 Installation point
8 Passage opening
9 Protective cap
10 Vehicle
11 Connection region
12 Energy store
13 Central opening The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a charging connection module, wherein the charging connection module includes a charging socket which is electrically contactable with an external electricity source and a pot unit which is fastenable to an outer panel of a vehicle, the method comprising the steps of:
    injection molding a basic form of the pot unit in a first cavity of an injection-molding tool by a first injection molding process; and
    subsequently, placing the basic form of the pot unit and the charging socket into a second cavity of the injection-molding tool and manufacturing the pot unit by a second injection-molding process such that the charging socket is fixedly integrated into the pot unit.

2. A method for producing a vehicle, the method comprising the steps of:
    producing a charging connection module according to claim 1; and
    fastening the pot unit to an outer panel of the vehicle, wherein the pot unit is received in an opening of the outer panel.

* * * * *